United States Patent
Schoenfeld et al.

(10) Patent No.: US 9,557,245 B2
(45) Date of Patent: Jan. 31, 2017

(54) TEST STATION FOR FLUID PUMPS AND FLUID INJECTORS

(75) Inventors: Dirk Schoenfeld, Altbach (DE); Karl Kastner, Ebersbach (DE); Kurt Blank, Ebersbach (DE)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 13/810,138

(22) PCT Filed: Jun. 6, 2011

(86) PCT No.: PCT/EP2011/059266
§ 371 (c)(1),
(2), (4) Date: Mar. 22, 2013

(87) PCT Pub. No.: WO2012/007227
PCT Pub. Date: Jan. 19, 2012

(65) Prior Publication Data
US 2013/0174655 A1    Jul. 11, 2013

(30) Foreign Application Priority Data

Jul. 16, 2010    (DE) .................. 10 2010 031 486

(51) Int. Cl.
*G01M 15/02*    (2006.01)
*F02M 65/00*    (2006.01)
*F04B 51/00*    (2006.01)

(52) U.S. Cl.
CPC ............. *G01M 15/02* (2013.01); *F02M 65/00* (2013.01); *F02M 65/001* (2013.01); *F04B 51/00* (2013.01)

(58) Field of Classification Search
USPC ........................ 73/114.38, 114.41, 114.42, 114.45,73/114.48, 114.68
See application file for complete search history.

(56) References Cited

U.S. PATENT DOCUMENTS 3,755,076 A      8/1973  Lindsley
4,180,036 A  * 12/1979  Wolf .............................. 123/557
4,481,931 A  * 11/1984  Bruner .......................... 123/557
(Continued)

FOREIGN PATENT DOCUMENTS

CN          2856465 Y      1/2007
DE          19618869       11/1997
(Continued)

OTHER PUBLICATIONS

International Search Report, dated Aug. 10, 2011, issued in corresponding PCT/EP2011/059266.

*Primary Examiner* — Eric S McCall
(74) *Attorney, Agent, or Firm* — Norton Rose Fulbright US LLP; Gerard Messina

(57) ABSTRACT

A test station for testing a fluid pump and/or a fluid injector has a fluid-pump receiving device for accommodating a fluid pump, a fluid-injector receiving device for accommodating a fluid injector, a fluid line which hydraulically connects the fluid-pump receiving device to the fluid-injector receiving device and which enables a fluid flow from the fluid pump to the fluid injector during operation, a sealed cooling circuit through which coolant is circulating during operation, and a first heat exchanger, which is developed and disposed in the fluid line so as to have the fluid flow and the coolant flow pass through it during operation such that a heat transfer takes place between the fluid flow and the coolant flow.

24 Claims, 1 Drawing Sheet

(56) References Cited

U.S. PATENT DOCUMENTS

| | | | | |
|---|---|---|---|---|
| 5,251,603 A | * | 10/1993 | Watanabe et al. | 123/541 |
| 5,284,120 A | * | 2/1994 | Fukushima | G01F 9/001 |
| | | | | 123/497 |
| 5,287,694 A | * | 2/1994 | Davis et al. | 60/785 |
| 5,499,615 A | * | 3/1996 | Lawrence et al. | 123/526 |
| 5,964,206 A | * | 10/1999 | White et al. | 123/541 |
| 6,454,621 B2 | * | 9/2002 | Matsuda | 440/88 R |
| 6,544,085 B1 | * | 4/2003 | Menard et al. | 440/88 C |
| 6,755,076 B1 | | 6/2004 | Schmidt et al. | |
| 7,574,858 B2 | * | 8/2009 | Moody | 60/320 |
| 8,635,992 B2 | * | 1/2014 | Bernhaupt | 123/543 |
| 2003/0089319 A1 | | 5/2003 | Duvinage et al. | |
| 2005/0150480 A1 | * | 7/2005 | Hoffmann et al. | 123/459 |
| 2008/0066721 A1 | * | 3/2008 | Friedman | 123/557 |
| 2008/0314370 A1 | * | 12/2008 | Weiche | 123/557 |
| 2010/0229808 A1 | * | 9/2010 | Demmith | F02M 31/16 |
| | | | | 123/41.01 |
| 2012/0046852 A1 | * | 2/2012 | Alger, II | 701/103 |
| 2012/0291759 A1 | * | 11/2012 | Bernhaupt | 123/541 |
| 2013/0186605 A1 | * | 7/2013 | Schoenfeld et al. | 165/157 |

FOREIGN PATENT DOCUMENTS

| | | |
|---|---|---|
| DE | 10 2006 013634 | 9/2007 |
| GB | 1135234 | 12/1968 |
| JP | 2008184981 A | 8/2008 |

* cited by examiner

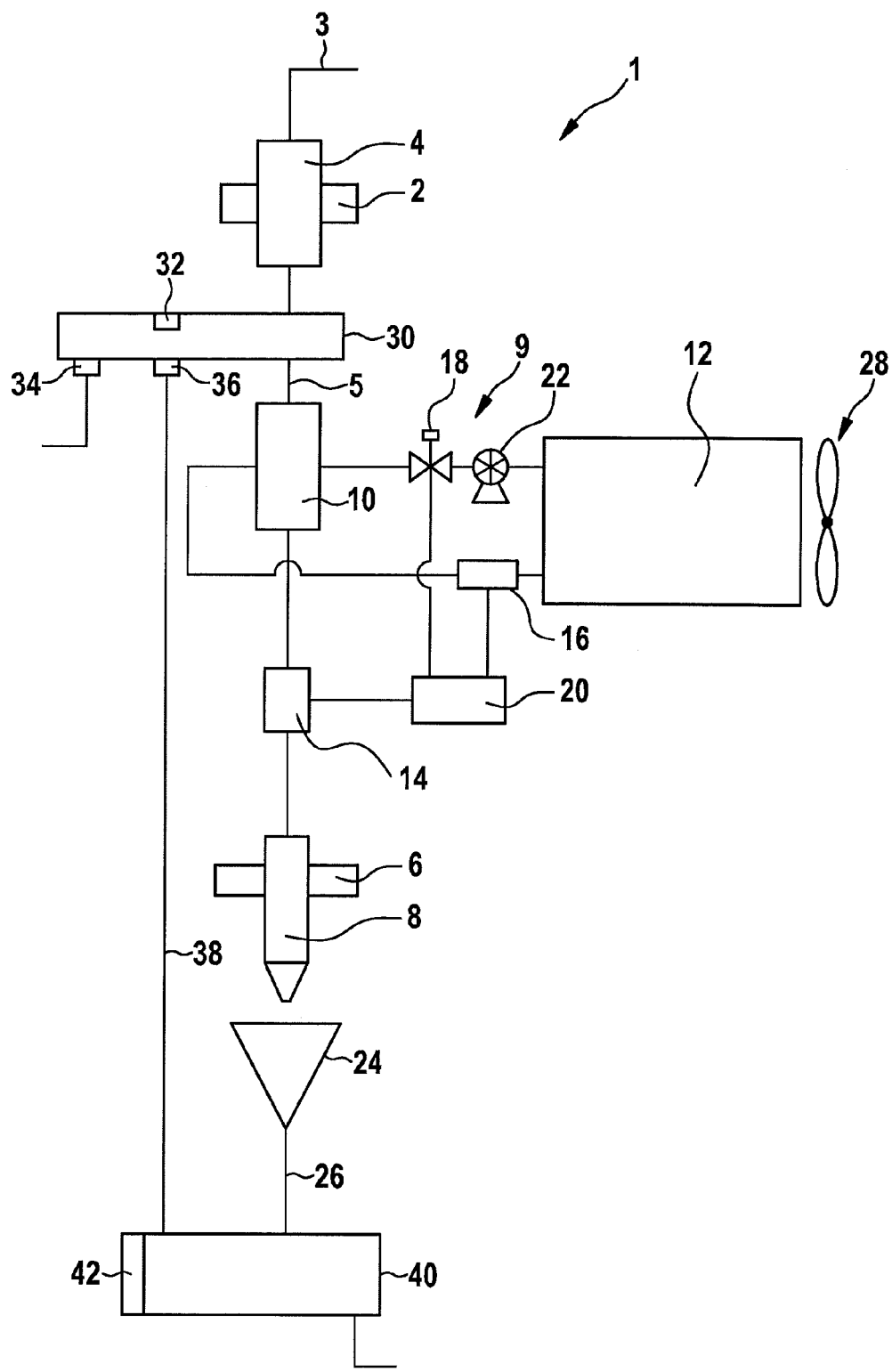

TEST STATION FOR FLUID PUMPS AND FLUID INJECTORS

CROSS REFERENCE TO RELATED APPLICATIONS

The present application is the national stage entry of International Patent Application No. PCT/EP2011/059266, filed on Jun. 6, 2011, which claims priority to Application No. DE 10 2010 031 486.2, filed in the Federal Republic of Germany on Jul. 16, 2010.

FIELD OF INVENTION

The present invention relates to a test station for fluid pumps and fluid injectors, especially fuel pumps and fuel injectors, which test station is equipped with a device for cooling a fluid flow. The present invention also relates to a method for cooling a fluid flow in a test station for fluid pumps and fluid injectors.

BACKGROUND INFORMATION

When checking fluid pumps in a test station, especially high pressure fuel pumps, and fluid injectors (fuel injectors) as they are used in Diesel engines, for instance, the injection fluid (test oil) used for the testing heats up and the injection fluid must be cooled in order to compensate for such heating. Different methods are known for this purpose.

In one known method, tap water is supplied to the test station, which absorbs heat from the injection fluid and thereby cools it. The heated water is then routed to the sewer.

In an alternative method, the injection fluid is cooled by an air cooler and the heat is dissipated to the ambient air.

SUMMARY

It is an object of the present invention to provide a device and a method which achieve improved cooling of the injection fluid used in a test station for fluid pumps and fluid injectors.

A test station for checking fluid pumps and fluid injectors according to the present invention is equipped with a fluid pump receiving device, which is developed to accommodate a fluid pump to be checked; it also includes a fluid injector receiving device, which is developed to accommodate a fluid injector to be checked; in addition, it has a fluid line, which establishes a hydraulic connection between the fluid pump receiving device and the fluid injector receiving device, such that a fluid flow from the fluid pump to the fluid injector is possible during operation. Moreover, a test station according to the present invention includes a sealed cooling circuit, through which a fluid coolant is flowing during operation, and a first heat exchanger, which is developed and disposed in the fluid line in such a way that the fluid in the fluid line and the coolant circulating in the fluid line flow through the heat exchanger, so that a heat transfer between fluid and coolant is able to take place.

In a method for cooling a fluid in a test station for fluid pumps and fluid injectors according to the present invention, a fluid coolant circulates through a sealed cooling circuit.

The fluid flow to be cooled _and the circulating coolant are routed through a first heat exchanger in a manner that causes a heat transfer between fluid and coolant.

The use of a fluid coolant provides high cooling power, especially greater cooling power than would be possible by air cooling.

Since the cooling circuit is sealed, the method according to the present invention and a test station according to the present invention are able to be operated in an environmentally safe and cost-effective manner because the coolant is not depleted but may be used over and over again. Furthermore, a method according to the present invention and a test station according to the present invention are operable independently of a water connection, so that the test station is able to be used for a broader spectrum of applications.

In one exemplary embodiment, the sealed cooling circuit is combined with an external water-cooling system. The external water-cooling system is connectable during times of peak loading, i.e., high cooling demands, in order to assist the sealed cooling circuit. The sealed cooling circuit thus is able to have smaller and more cost-effective dimensions because it need not be configured for providing adequate cooling at times of peak demand as well.

In one exemplary embodiment of a test station according to the present invention, a second heat exchanger, which is suitable for dissipating heat from the coolant, is disposed in the cooling circuit. A second heat exchanger may be employed for effective cooling of the coolant in order to discharge heat from the cooling circuit.

In one exemplary embodiment, the coolant is a liquid. A liquid coolant is easy to handle and provides excellent and uniform cooling of the injection fluid.

In one exemplary embodiment, the coolant contains water. Water is a cheaper and more efficient coolant, which, if required, is easily replenished and disposed of without any problems.

In one exemplary embodiment, the cooling circuit is equipped with a cold water substitute. A conventional coldwater substitute allows simple, efficient and cost-effective cooling of the coolant.

In one exemplary embodiment, the test station has at least one fluid-temperature sensor, which is developed to measure the temperature of the injection fluid. In particular, at least one fluid-temperature sensor may be disposed upstream and/or downstream from the first heat exchanger, in order to measure the temperature of the injection fluid prior to and/or after passing through the first heat exchanger. Such a fluid-temperature sensor makes it possible to effectively monitor the temperature of the injection fluid.

In one exemplary embodiment, at least one coolant-temperature sensor for measuring the temperature of the coolant is provided in the cooling circuit.

In one exemplary embodiment, at least one valve is situated in the cooling circuit, which regulates the coolant flow through the cooling circuit.

In one exemplary embodiment, a control is provided, which is electrically connected to the valve and designed to regulate the coolant flow in the cooling circuit by controlling the valve.

The control preferably is connected to at least one fluid- and/or coolant-temperature sensor, in order to regulate the coolant flow as a function of the temperature of the injection fluid and/or the coolant.

Such a control makes it possible to adjust the temperature of the injection fluid to a desired value for a particular testing procedure. This improves the precision and reproducibility of the results of the testing procedure.

The present invention will now be explained in detail in the following description, with reference to the accompanying drawing.

BRIEF DESCRIPTION OF THE DRAWING

The Figure shows a schematic view of a test station according to the present invention, which is developed for testing fluid pumps and fluid injectors.

DETAILED DESCRIPTION

A test station 1 according to the present invention has a fluid pump receiving device 2, which is designed to accommodate a fluid pump 4 to be tested.

A test station 1 according to the present invention has a fluid injector receiving device 6, which is designed to accommodate a fluid injector 8 to be tested.

Fluid pump receiving device 2 and fluid injector receiving device 6 are developed in such a way that a fluid pump 4 to be tested and a fluid injector 8 to be tested are hydraulically connected to one another by a pressure reservoir 30 and a fluid line 5, when—in the operating state (test state)—a fluid pump 4 is situated in fluid pump receiving device 2 and a fluid injector 8 is situated in fluid injector receiving device 6.

To test fluid pump 4 and/or fluid injector 8, fluid pump 4 is controlled by a control device (not shown in the figure) such that it supplies injection fluid from a fluid supply line 3, which is connected to a tank (not shown in the figure), into pressure reservoir 30 under increased pressure.

The fluid pressure in pressure reservoir 30 is measurable by at least one pressure sensor 32 disposed inside pressure reservoir 30, and is adjustable to the desired value very precisely by triggering a pressure-adjustment valve 34, by which excess fluid from pressure reservoir 30 is able to be returned into tank (not shown).

Via fluid line 5, pressure reservoir 30 is hydraulically connected to fluid injector 8 to be tested, in order to supply pressurized fluid to fluid injector 8 during operation.

The fluid output by fluid injector 8 in (testing) operation is caught by a collection device 24 and returned to the not illustrated tank via a return line 26, in which a fluid-measuring unit 40 is disposed, which is developed to measure the fluid quantity flowing through return line 26. Fluid-measuring unit 40 is connected to an evaluation and display unit 42, which analyzes and displays the fluid quantity measured by fluid-measuring unit 40, and/or transmits it to a diagnostic unit.

In addition, pressure reservoir 30 is hydraulically connected to fluid-measuring unit 40 via a bypass line 38, which is able to be closed with the aid of a bypass valve 36. Bypass valve 36 is closed when fluid injector 8 is tested. To test fluid pump 4, bypass valve 36 is opened and fluid injector 8 is not triggered, so that fluid-measuring unit 40 measures the fluid quantity supplied by fluid pump 4.

A first heat exchanger 10 is situated in fluid line 5 between fluid pump 4 and fluid injector 8, such that the injection fluid in fluid line 5 flows through it.

Test station 1 has a sealed cooling circuit 9 provided with a second heat exchanger 12. Cooling circuit 9 is developed in such a way that a coolant flows through cooling circuit 9, and especially through first heat exchanger 10, during operation of cooling circuit 9, such that a heat transfer takes place from the injection fluid flowing through the fluid line, to the coolant flowing through cooling circuit 9. During operation the coolant flowing through cooling circuit 9 absorbs heat from the injection fluid that flows through fluid line 5, and the temperature of the injection fluid in fluid line 5 is reduced.

The coolant in cooling circuit 9 flows through a second heat exchanger 12, which may be part of a cold water substitute, for example, where it gives off the absorbed heat. A coolant pump 22 is additionally provided in cooling circuit 9, which facilitates the passage of the coolant through cooling circuit 9. Cooling circuit 9 preferably is completely sealed, so that no coolant is used up during operation. The coolant preferably contains water, which is an effective, inexpensive and easily available coolant, and it is able to be disposed of without any problems.

If necessary, other fluid coolants may be used as well. In particular coolants having greater thermal capacity and/or a higher boiling point than water are usable. Alternatively or additionally, cooling circuit 9 may be sealed in pressure-tight manner in order to increase the boiling point of the coolant.

A coolant-temperature sensor 16 and a coolant valve 18 are provided in cooling circuit 9 in order to measure the temperature of the coolant within cooling circuit 9 or to regulate the coolant flow through cooling circuit 9.

Situated downstream from first heat exchanger 10 in fluid line 5 is a fluid-temperature sensor 14 for measuring the temperature of the injection fluid in fluid line 5 downstream from first heat exchanger 10, i.e., between first heat exchanger 10 and fluid injector 8. Alternatively or additionally, a fluid-temperature sensor 14 may be disposed upstream from first heat exchanger 10, between fluid pump 4 and first heat exchanger 10, in order to measure the temperature of the injection fluid before it enters first heat exchanger 10.

Fluid-temperature sensor 14, coolant-temperature sensor 16 and coolant valve 18 are electrically connected to a controller 20. Controller 20 is designed to control coolant valve 18 and possibly coolant pump 22 as a function of the temperatures measured by temperature sensors 14, 16 and a predefined target temperature, which the injection fluid is to have when entering fluid injector 8.

In this way the temperature of the injection fluid in fluid line 5 is able to be adjusted to a value desired for a particular testing operation, by controlling coolant valve 18 and possibly coolant pump 22. The precision and reproducibility of the results of the testing procedure are able to be improved in this manner. In particular, a constant temperature of the injection fluid is adjustable by appropriate control of coolant valve 18 and possibly coolant pump 22.

In one exemplary embodiment, which is not shown, the controller may additionally also act on second heat exchanger 12 in order to regulate the temperature of the coolant in cooling circuit 9. A ventilator 28 may be provided, which generates an air flow through second heat exchanger 12, and controller 20 may be connected to ventilator 28 so as to control the air flow through second heat exchanger 12. As an alternative or in addition, adjustable flaps may be provided, which are able to be triggered by controller 20 in order to regulate the air flow through second heat exchanger 12. The range within which the temperature of the injection fluid is adjustable is thus able to be expanded.

What is claimed is:

1. A test station for testing at least one of a fluid pump and a fluid injector, comprising:
    a fluid pump receiving device which is configured to receive and accommodate a fluid pump to be tested;
    a fluid injector receiving device which is configured to receive and accommodate a fluid injector to be tested;
    a fluid line, which hydraulically connects the fluid pump receiving device to the fluid injector receiving device and enables a flow of fluid from the fluid pump to the fluid injector during operation;

a closed cooling circuit, through which a flow of coolant is circulating during operation; and a first heat exchanger, which is configured and disposed in the fluid line downstream of the fluid pump and upstream of the fluid injector such that, before passing through the fluid injector, the fluid flow from the fluid pump and the coolant flow pass through the first heat exchanger during operation such that a heat transfer takes place between the fluid and the coolant.

2. The test station according to claim 1, further comprising:
a second heat exchanger provided in the cooling circuit to dissipate heat from the coolant.

3. The test station according to claim 1, wherein the coolant is liquid and contains water.

4. The test station according to claim 3, wherein the cooling circuit is equipped with a cold-water substitute.

5. The test station according to claim 1, further comprising:
at least one fluid-temperature sensor configured to measure a temperature of the fluid.

6. The test station according to claim 5, wherein the at least one fluid-temperature sensor is disposed at least one of upstream and downstream from the first heat exchanger.

7. The test station according to claim 1, further comprising:
at least one coolant-temperature sensor configured to measure a temperature of the coolant in the cooling circuit.

8. The test station according to claim 1, further comprising:
a coolant valve, which is disposed in the cooling circuit and configured to regulate the coolant flow in the cooling circuit.

9. The test station according to claim 8, further comprising:
a controller, which is connected to the coolant valve and configured to regulate the coolant flow in the cooling circuit by controlling the coolant valve.

10. The test station according to claim 1, further comprising:
a second heat exchanger which is disposed in the cooling circuit, wherein a controller, which is connected to a coolant valve, also acts on the second heat exchanger to regulate the temperature of the coolant in the cooling circuit; and
a ventilator to generate an air flow through the second heat exchanger, wherein the ventilator is controlled so as to control the air flow through the second heat exchanger.

11. The test station according to claim 10, wherein the ventilator includes adjustable flaps, which are trigger-able by a controller to regulate the air flow through the second heat exchanger, so that a range within which the temperature of the injection fluid is adjustable is expanded.

12. The test station according to claim 1, wherein when, in a test operation, the fluid pump is situated in the fluid pump receiving device and the fluid injector is situated in the fluid injector receiving device, and wherein to test the fluid pump and/or the fluid injector, the fluid pump is controlled to supply injection fluid from a fluid supply line into a pressure reservoir under increased pressure.

13. The test station according to claim 1, wherein a fluid pressure in a pressure reservoir is measurable by at least one pressure sensor disposed inside the pressure reservoir, and is adjustable to a desired value by triggering a pressure-adjustment valve, by which excess fluid from the pressure reservoir is returnable into a tank.

14. The test station according to claim 1, wherein a pressure reservoir is hydraulically connected via the fluid line to the fluid injector to be tested to supply pressurized fluid to the fluid injector during the test operation.

15. The test station according to claim 1, wherein a pressure reservoir is hydraulically connected to a fluid-measuring unit via a bypass line, which closable with a bypass valve, which is closed when the fluid injector is tested.

16. The test station according to claim 1, wherein to test the fluid pump, a bypass valve is opened and the fluid injector is not triggered, so that a fluid-measuring unit measures the fluid quantity supplied by the fluid pump.

17. The test station according to claim 1, wherein during operation the coolant flowing through the cooling circuit absorbs heat from the injection fluid that flows through the fluid line, and a temperature of the injection fluid in the fluid line is reduced.

18. The test station according to claim 1, wherein the coolant in the cooling circuit flows through a second heat exchanger, which is disposed in the cooling circuit, where it gives off absorbed heat.

19. The test station according to claim 1, wherein the cooling circuit includes a coolant pump to facilitate passage of the coolant through the cooling circuit.

20. The test station according to claim 1, wherein the cooling circuit is sealed, so that no coolant is used up during the test operation.

21. The test station according to claim 1, wherein the cooling circuit includes a coolant-temperature sensor and a coolant valve to measure the temperature of the coolant within the cooling circuit or to regulate the coolant flow through the cooling circuit.

22. The test station according to claim 1, wherein a coolant-temperature sensor, a coolant valve, and at least one of fluid-temperature sensors are electrically connected to a controller, which controls at least the coolant valve as a function of temperatures measured by temperature sensors and a predefined target temperature, which the injection fluid is to have when entering the fluid injector.

23. The test station according to claim 1, wherein the temperature of the injection fluid in the fluid line is adjustable to a value desired for a particular testing operation, by controlling at least a coolant valve, wherein a constant temperature of the injection fluid is adjustable by controlling the coolant valve and/or a coolant pump.

24. A test station to test at least one of a fluid pump and a fluid injector, comprising:
a fluid pump receiving device to receive a fluid pump to be tested;
a fluid injector receiving device to receive a fluid injector to be tested, wherein the fluid pump receiving device and the fluid injector receiving device are configured so that the fluid pump to be tested and/or the fluid injector to be tested are hydraulically connected to one another by a pressure reservoir and a fluid line;
a collection device, wherein the fluid output by the fluid injector is caught by the collection device and returned to the tank via a return line, in which a fluid-measuring unit is disposed, the fluid measuring unit being configured to measure the fluid quantity flowing through the return line;
an evaluation and display unit, connected to the fluid-measuring unit, to analyze and at least one of display a measured fluid quantity measured by the fluid-measuring unit and transmit the measured fluid quantity to a diagnostic unit;

a first heat exchanger situated in the fluid line between the fluid pump and the fluid injector, such that the injection fluid in the fluid line flows through it;

a cooling circuit having a second heat exchanger, wherein the cooling circuit is configured so that a coolant flows through the cooling circuit, and through the first heat exchanger, during operation of the cooling circuit, such that a heat transfer occurs from the injection fluid flowing through the fluid line, to the coolant flowing through the cooling circuit; and at least one of a first fluid-temperature sensor, situated downstream from the first heat exchanger in the fluid line, to measure the temperature of the injection fluid in the fluid line downstream from the first heat exchanger, between the first heat exchanger and the fluid injector, and a second fluid-temperature sensor disposed upstream from the first heat exchanger, between the fluid pump and the first heat exchanger, to measure the temperature of the injection fluid before it enters first heat exchanger.

\* \* \* \* \*